US005954415A

United States Patent [19]

Weigert

[11] Patent Number: 5,954,415

[45] Date of Patent: Sep. 21, 1999

[54] ILLUMINATING APPARATUS

[75] Inventor: Dedo Arndt Weigert, Munich, Germany

[73] Assignee: Dedo Weigert Film GmbH, Munich, Germany

[21] Appl. No.: 08/710,763

[22] Filed: Sep. 20, 1996

[30] Foreign Application Priority Data

| | | | |
|---|---|---|---|
| Sep. 25, 1995 | [DE] | Germany | 195 35 601 |
| Aug. 6, 1996 | [DE] | Germany | 196 31 740 |

[51] Int. Cl.[6] .......... G03B 15/02

[52] U.S. Cl. .......... 362/18; 362/302; 362/303

[58] Field of Search .......... 362/17, 18, 302, 362/303, 343, 304, 305, 298

[56] References Cited

U.S. PATENT DOCUMENTS

| | | | |
|---|---|---|---|
| 1,270,261 | 6/1918 | Brueggeman | 362/302 |
| 1,334,710 | 3/1920 | Miners . | |
| 2,107,027 | 2/1938 | Doane | 362/302 |
| 3,634,675 | 1/1972 | Madsen | 362/303 |
| 3,651,320 | 3/1972 | Lasker | 362/303 |
| 5,105,347 | 4/1992 | Ruud et al. . | |

FOREIGN PATENT DOCUMENTS

| | | |
|---|---|---|
| 906 246 | 1/1954 | Germany . |
| 1 953 208 | 2/1961 | Germany . |
| 2 106 868 | 4/1972 | Germany . |
| 32 22 501 | 12/1982 | Germany . |
| 39 37 889 C1 | 5/1991 | Germany . |
| 88 17 192 | 12/1994 | Germany . |

OTHER PUBLICATIONS

Dedo Weigert Film Licht pp. J3, J9, J17, J30, J51, J52, J57 and J58.

*Primary Examiner*—James C. Yeung
*Attorney, Agent, or Firm*—Griffin, Butler, Whisenhunt & Szipl, LLP

[57] ABSTRACT

An illuminating apparatus includes a light source (1) and a first reflector (2) arranged for reflecting light emitted by the light source. A three-dimensional attachment is mounted on the first reflector along a direction in which the first reflector reflects. The attachment has a sidewall (6) with a light-transmitting and scattering portion. A panel (7) of the attachment, positioned opposite the first reflector is, opaque. The illuminating apparatus further has a second reflector (3) with a hollowed-segmented sphere shape. The second reflector is positioned between the light source and the opaque panel of the attachment positioned opposite the first reflector. The second reflector (3) is smaller than the first reflector and has a reflecting concave surface facing the light source. The illuminating apparatus is compact, emits diffused light, and displays a bat-wing characteristic light distribution.

14 Claims, 10 Drawing Sheets

ILLUMINATING APPARATUS

BACKGROUND OF THE INVENTION

This invention concerns an illuminating apparatus having a light source and a first reflector directed toward the light source.

When illuminating for filming, television production, and photography it can be desirable not to employ direct lighting. Direct light from a lamp creates, because of a small radiation area, or area of emission, hard shadows which are not desirable for particular illumination purposes. In this regard, it is particularly difficult to illuminate long narrow corridors. Illumination of such corridors with prior-art lamps arranged linearly on a ceiling, which display a substantially uniform light radiation to all sides, is unsuitable for this purpose. An actor moving along a length of such a corridor would be illuminated to a greater degree as he approaches a lamp. Thus, an expression, that the actor's face "burns up" as he approaches a lamp, is used in the trade. When the actor is directly under the lamp, he is illuminated from directly above, whereby his eyes suddenly appear to be in deep shadow. Such effects are reduced by employing illumination systems which exhibit light distribution having bat-wing characteristics. "Bat-wing-characteristics" means, in this regard, that for a hanging arrangement of an illumination device, light is directed vertically sidewardly downwardly, no light is emitted directly downwardly, the intensity of the radiated light changes with beam angle, the light intensity is reduced with an increase in the steepness at which light is directed downwardly, and transitions between illuminated and non-illuminated areas are soft or gradual. A light apparatus with bat-wing-characteristics is schematically represented in FIGS. 18 A–D.

Open spotlights, or floodlights, cannot create such bat-wing characteristics of light distribution. An open floodlight has a reflector adjacent a light source. The reflector directs the light. In this manner a radiation surface, or area, is enlarged. However, the radiation surfaces for many such floodlights are still relatively small, and definite shadows, with hard shadow edges, are created therewith.

Other floodlights include a lamp, a reflector and a lens. Such lenses are made as Fresnel, or stepped, lenses or as normal condenser lenses. In this manner, light direction as well as light distribution can be better influenced. Still, however, a radiation area remains small. For many illuminating operations, therefore, a diffusion material, which is more-or-less light-transmissive and which more-or-less scatters light, is positioned at smaller or larger distances in front of the floodlight. The thicker this diffusion material is, the greater are the diffusion angles of light that are emitted from the diffusion material. In this manner, the radiation angle is more or less uncontrolled. If light should be shaded from an object, opaque sheets can be used which must, however, be positioned, separate from the lamp at appropriate spacings in front of the diffusion material.

When a light source is to be employed which creates soft edges, there are various apparatus known in the prior art for enlarging the radiation area.

A reflection umbrella, or diffusion umbrella (screen), is known from a publication, Dedo Weigert Film, Licht (see pages J3, J9, J17 and J30). With this arrangement, an umbrella, or screen, is opened adjacent a floodlight. The screen can have a reflecting surface. In this manner, the light that is reflected back from the screen can have a large radiation area. Such a screen can also be made of a translucent or transparent material so that the light which passes therethrough has a greater radiating area and, in this manner, creates a desired softness to shading. By employing a plurality of such reflection/diffusion screens at particular spacings from one another, from the lamp and from an object to be illuminated, it is often possible to achieve a relatively good illumination for one camera position. However, if the position of the camera is changed for a new adjustment, for example, from an end of the scene to the other, then a plurality of stands supporting the reflection/diffusion screens must be moved and a new arrangement of the reflection/diffusion screens must be employed. This is work and time intensive, which negatively impacts on production costs for corresponding film and photo sessions.

A further device in the prior art is a so called Chinese lantern. Structurally, this is similar to a child's lantern or a paper lamp shade that is employed in a living room. A diffusion material surrounds a light source almost completely. The light is emitted completely about the lamp shade in a uniform manner; however, it has no bat-wing characteristics in its intensity's distribution. An ability to influence a radiation direction is only possible to a limited extent.

The publication Dedo Weigert Film, Licht discloses further soft light attachments (see pages J51 and J52). These attachments are made of textile material which can be placed in front of many different types of floodlights. Four sides of these attachments are made of a textile material which is opaque, and reflective on its inner surfaces. A front side of each of these soft light attachments is covered with a diffusion material. By use of such attachments, large area light can be created that produces soft shade transitions. The light of such soft light attachments can also be modified by Jalousies or grids, which can limit radiation-direction areas of the lamp.

Such soft light attachments are often made to have a tent-like constructions, with an inner-reflecting and otherwise opaque material being stretched on four spars. Thus, when seen from an observation direction along a normal to the light radiation area they often haven a rectangular or square structure.

The publication Dedo, Weigert, Film Licht, (pages J57 and J58) discloses an illuminating apparatus having a light source, a reflector adjacent the light source and a substantially two dimensional light scattering attachment arranged on the reflector. This device is a collapsible (foldable) soft-light producing structure. In this device an opaque textile material having a reflecting interior surface forms sides. Also in this construction, a front area is covered by a diffusion material. Such umbrella-like, or tent-like, structures with spars are well known. Because of its structure, this soft-light apparatus does not create a light distribution having bat-wing characteristics.

German Patent Publication DE-39-37-889 discloses an electrical lamp with a, substantially, point light source and an adjacent first reflector. A pipe shaped body of light-transmissive material is mounted on the first reflector, on whose wall, depending upon an incident angle of light rays, a reflecting or light transmissive foil is surroundingly mounted. A second reflector whose dimensions are substantially the same of those of the first reflector is mounted on the pipe-shaped body at an end thereof opposite an end at which the first reflector is mounted. A diffuser is located within the pipe-shaped body. The diffuser is formed of a narrow body which extends from one end of the pipe-shaped body to the other end and which is arranged to be spaced from the foil over its entire length. In the lamp, according to German publication DE-39-37-889, this combination of diffuser and foil or film serves the function of a completely uniform pipe-shaped light source. A light distribution created by the lamp according to DE-39-37-889 has no bat-wing characteristics.

It is an object of this invention to provide a compact illuminating apparatus which gives off diffused light whose distribution has bat-wing characteristics.

SUMMARY OF THE INVENTION

According to principles of this invention, an illuminating apparatus includes: a light source; a first reflector arranged adjacent the light source; a three-dimensional attachment mounted on the first reflector along a reflecting direction of the first reflector which has a sidewall with a portion for laterally transmitting and scattering light and a panel positioned opposite the first reflector which is opaque; and a second reflector having a segmented spherical shape which is arranged between the light source and the opaque panel of the attachment positioned opposite the first reflector, said second reflector being smaller than the first reflector, and having a reflecting, concave, side facing the light source.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characteristics refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
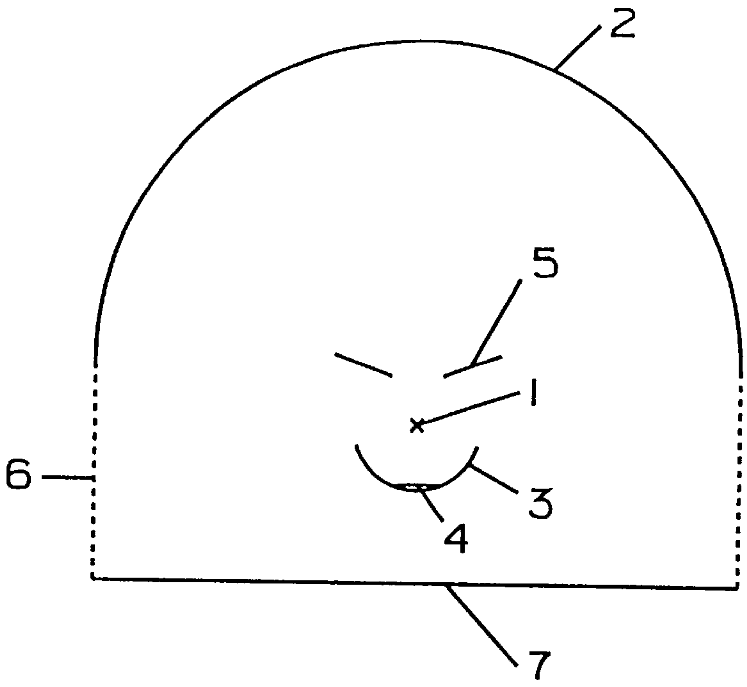
FIG. 1 is a schematic side sectional view of an illuminating apparatus of this invention having four reflectors.

An embodiment of this invention, depicted in FIG. 1, has a light source 1. The light source 1 is, in a normal manner, arranged adjacent a first reflector 2. A box-shaped (enclosed) attachment, having a rectangular base surface, is mounted on the first reflector in a radiating, or reflecting, direction. An entire surrounding sidewall 6 of the attachment is translucent (light transmissive and diffusive) The sidewall 6 is approximately aligned with edges of the first reflector 2. A panel 7 of the attachment, which is opposite the first reflector 2, is opaque.

Between the light source 1 and the opaque panel 7 of the attachment, which lies opposite the first reflector 2, is arranged a substantially-spherical-segment, hollow-shaped, second reflector 3. The second reflector 3 is smaller than the first reflector 2 and its reflecting concave surface is directed toward the light source 1. In the depicted embodiment the second reflector is also significantly smaller than the opaque panel 7.

A third reflector 4 is centrally arranged in the second reflector 3. The third reflector 4 is shaped to have outwardly bowing (convexed) spherical segment surface bowing toward the light source 1.

A fourth reflector 5 is arranged between the light source 1 and the first reflector 2. The fourth reflector 5 has a shape of a truncated cone whose outer surface is reflective. A small opening at an apex of the cone of the fourth reflector 5 is directed toward the light source 1 and is substantially parallel to the opaque side 7 of the attachment which is arranged opposite the first reflector 2.

A manner of operation of this embodiment of the illuminating apparatus of this invention is made clear in FIGS. 2–10 which show representative lights paths.

Figure 2:
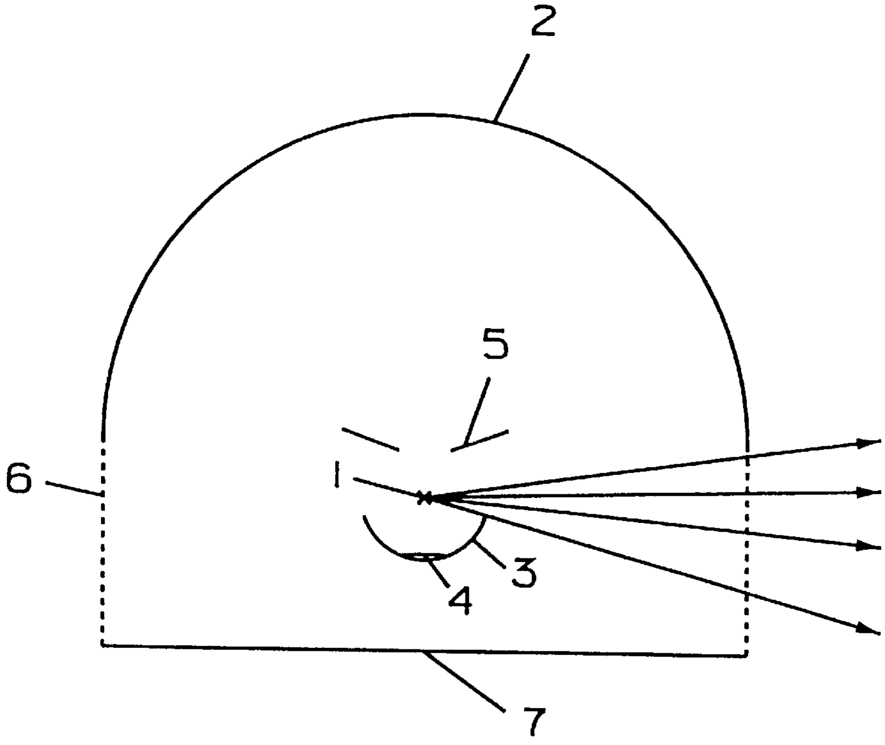
FIGS. 2–10 are each schematic side sectional views of the embodiment of FIG. 1 showing selected light paths in the embodiment of FIG. 1.

FIG. 2 shows light beams which radiate sidewardly, outwardly, away from the light source 1 without intervening reflections.

Figure 3:
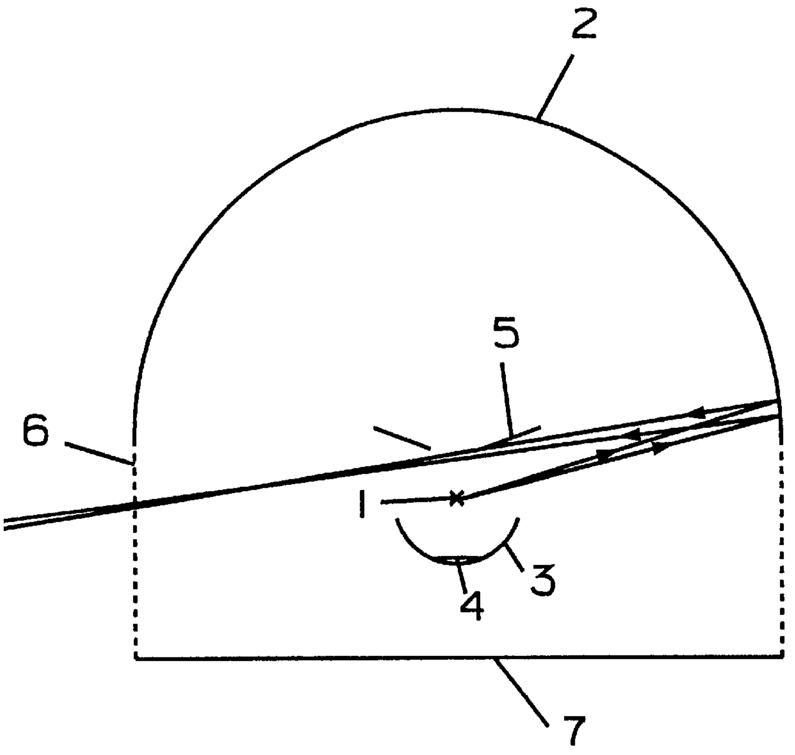

In FIG. 3, light beams are shown which, after one reflection on the first reflector 2, escape outwardly sidewardly.

Figure 4:
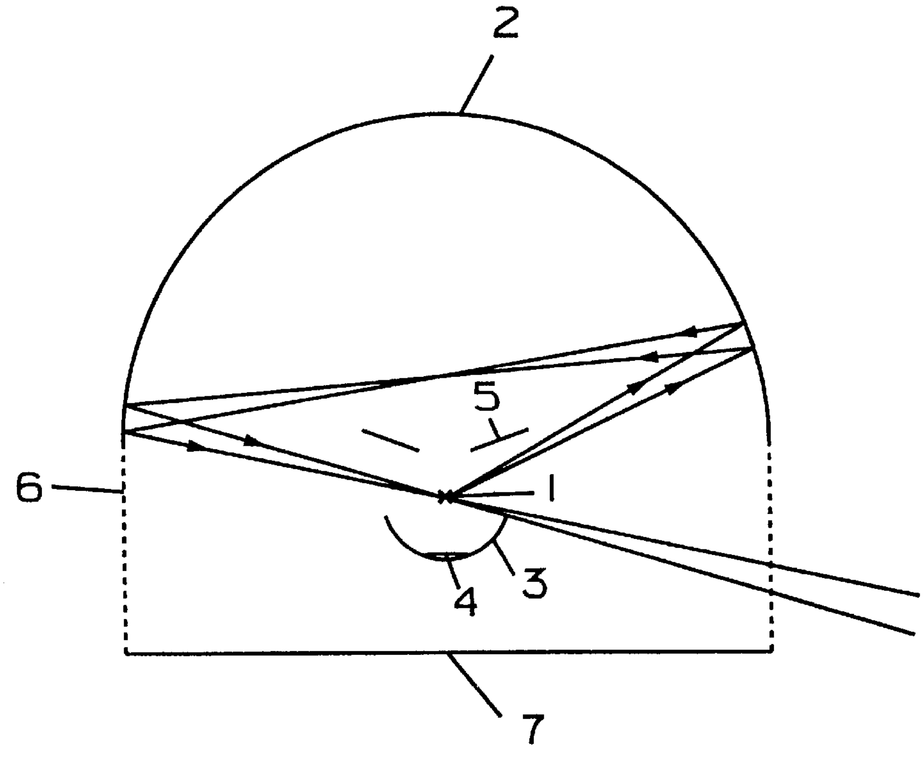

FIG. 4 depicts light beams which, after two reflections on the first reflector 2, escape outwardly to the side. If one assumes that the illuminating apparatus is mounted to hang, the beams shown in FIG. 4 fall at steeper angles downwardly then do the beams of FIGS. 2 and 3. By means of the two-time reflections depicted in FIG. 4, the intensity of the beams when they exit from the illuminating apparatus, because of reflection losses, is weaker than the intensity of the light beams of FIGS. 2 and 3.

Figure 5:
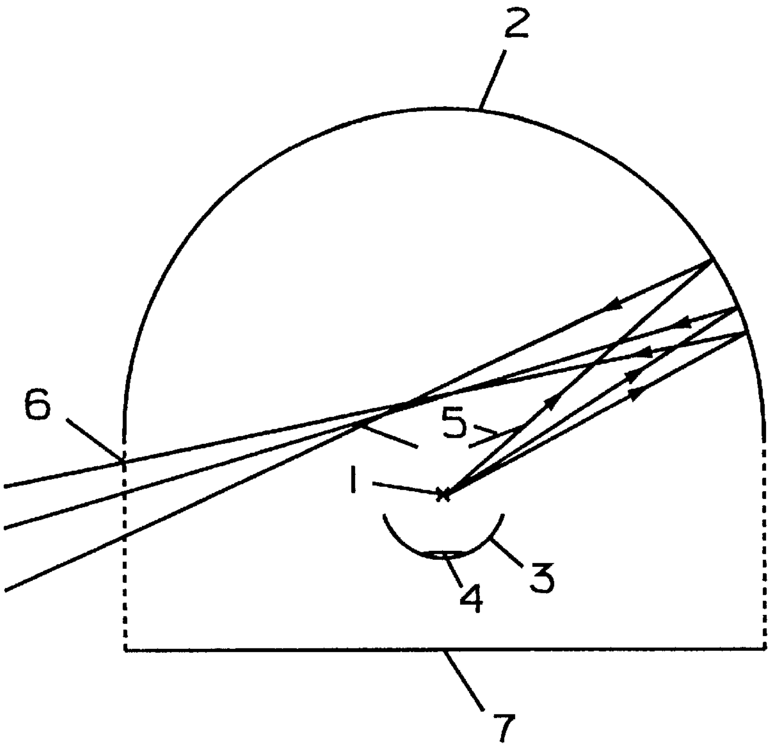

FIG. 5 shows, complementing FIG. 3, a further beam escape angle area in which light beams which have been reflected once from the first reflector 2 are affected.

Figure 6:
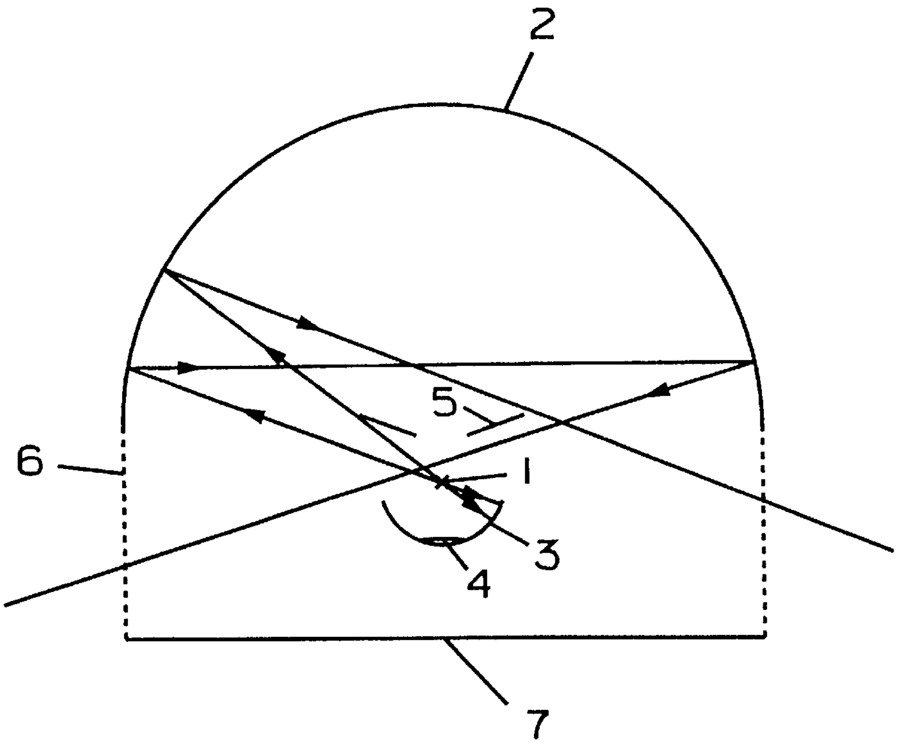

In FIG. 6 light beams are shown which are reflected on the second reflector 3 as well as on the first reflector 2. It should be noted, in this regard, that this is only a two-dimensional projection of light beams in three-dimensional space. It is clear from this that a thrice reflected light beam escapes downwardly from the illuminating apparatus of this invention at a steeper angle than does a light beam that has been reflected only twice. Because of an intensity loss with each reflection, this fact has a substantial influence on an intensity distribution of the overall light emitted from the illuminating apparatus.

Figure 7:
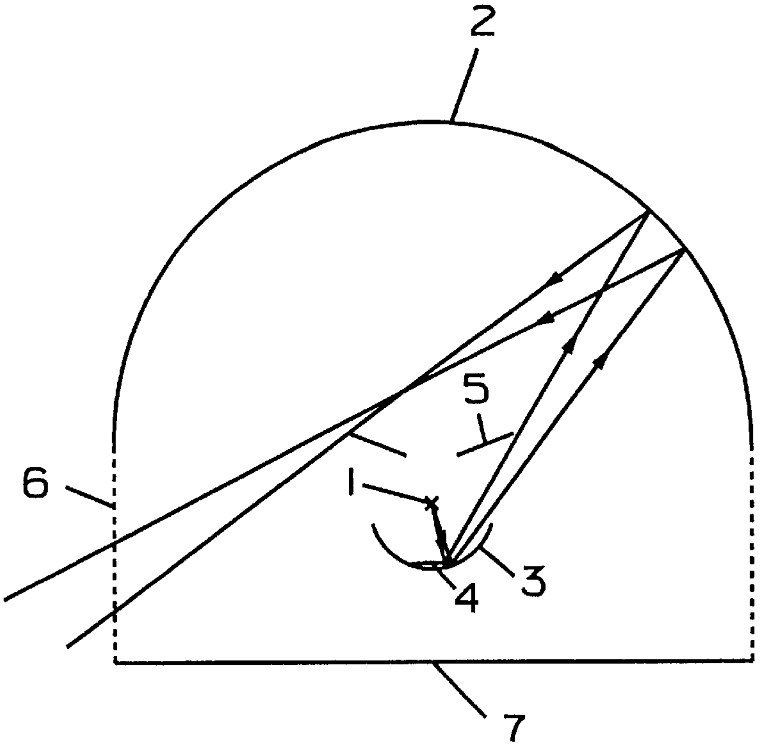

FIG. 7 makes clear a function of the third reflector 4. This reflector serves particularly for reducing multiple reflections between the second reflector 3 and the first reflector 2. In this manner, unnecessary reflection losses can be avoided and a particularly effective exploitation of a light bundle produced by the light source 1 is achieved.

Figure 8:
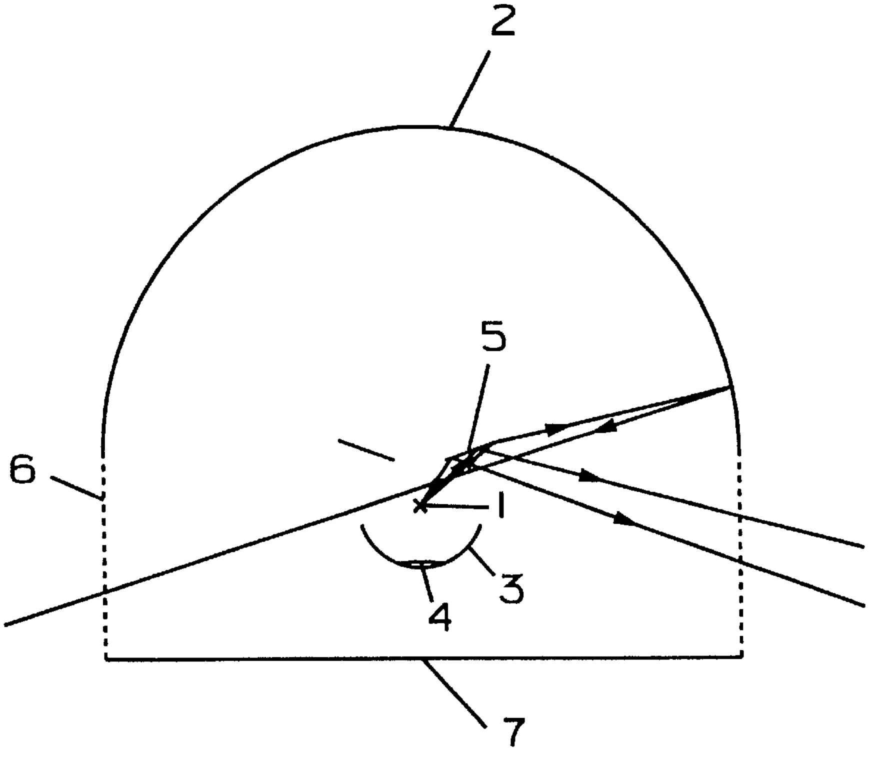

The fourth reflector 5 has a similar function. Beam paths in relation to the fourth reflector 5 alone or in cooperation with the first reflector 2, are shown in FIG. 8.

Figure 9:
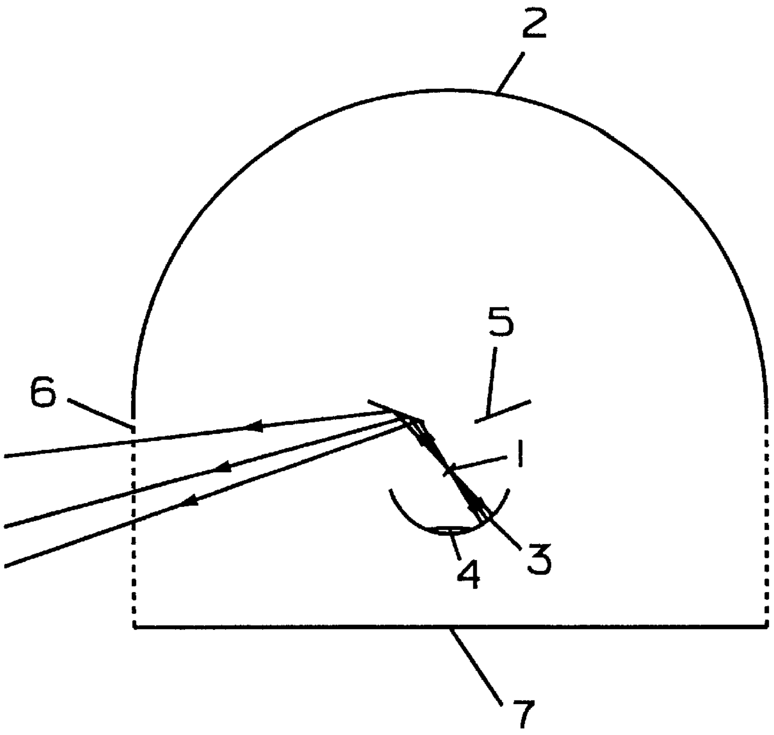

FIG. 9 displays cooperation between the second reflector 3 and the fourth reflector 5.

Figure 10:
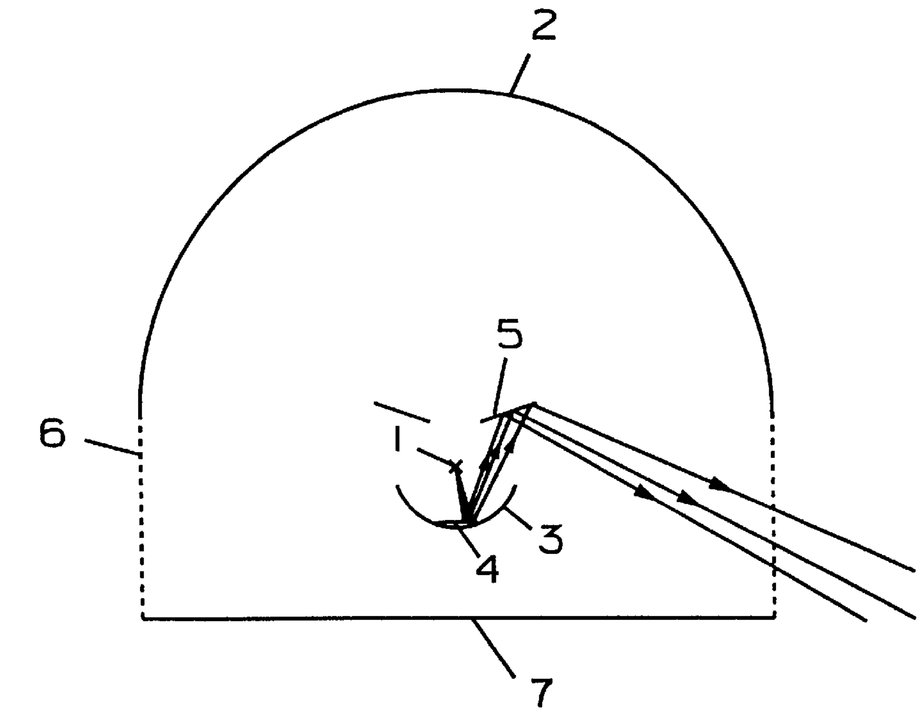

Beam paths are shown in FIG. 10 which strike the third reflector 4 as well as the fourth reflector 5.

An overlay of all the possible beam paths of the embodiment of the illuminating apparatus, depicted in FIG. 1, produce a resulting light distribution with bat-wing-characteristics as are schematically shown in FIGS. 18 A–D. The lengths of the arrows in FIGS. 18 A–D are proportional to light intensity.

Figure 11:
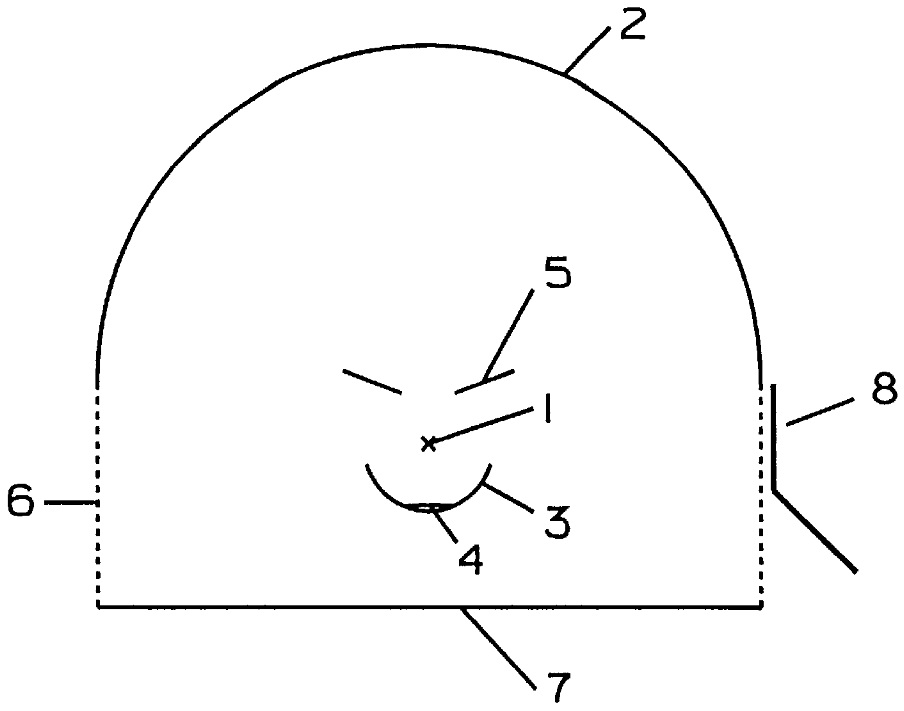
FIG. 11 is a schematic side sectional view of a first enhanced embodiment illuminating apparatus of this invention including a bendable light cover device.

Covering devices can be fastened to the wall 6 of the illuminating apparatus. FIG. 11 shows a first enhanced embodiment of the illuminating apparatus of this invention in which a bendable (its bent angle can be changed) light cover device 8 is mounted on the wall 6. By means of this light covering device a corresponding side of the wall can be selectively covered completely or partially so that a bundle of exiting light on this respective side is correspondingly influenced. Further, an influencing of a spatial-distribution of exiting light is achieved. Thus, it is possible to accentuate a light intensity distribution while retaining bat-wing-characteristics.

Figure 12:
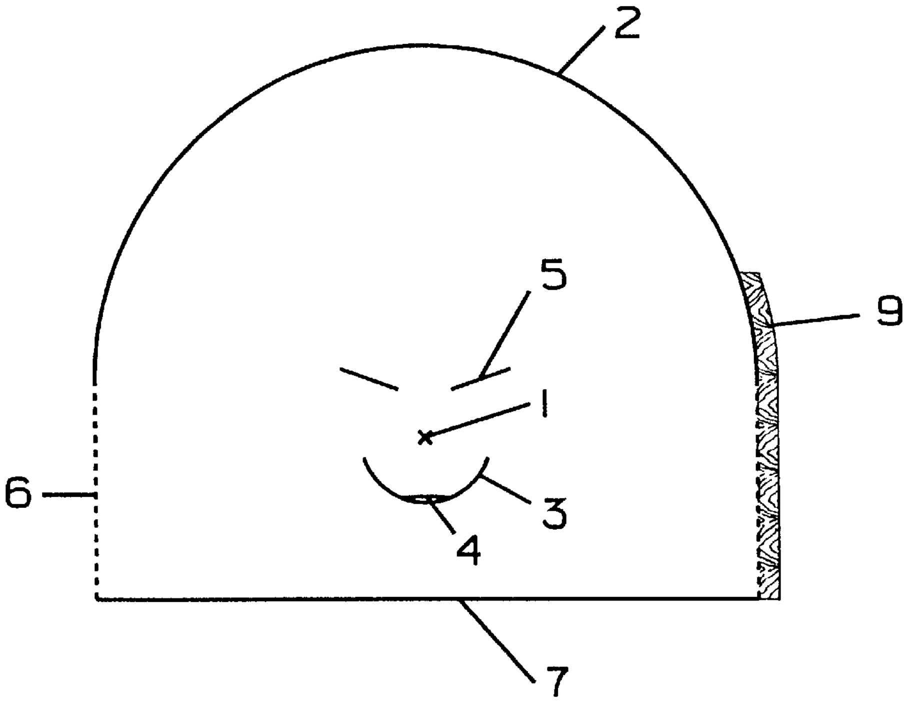
FIG. 12 is a schematic side sectional view of a second enhanced embodiment illuminating apparatus of this invention including a Velcro-like strip (burr band) (Klettband)

The light covering device 8 can be attached to a wall 6 with the help of interengaging bands 9, so called burr-bands (Velcro), in one embodiment of the illuminating apparatus of this invention. This is particularly beneficial if the light covering device 8 is constructed of textile material. Such a second enhanced embodiment of the illuminating apparatus of this invention, with a burr band 9, is shown in FIG. 12, wherein, for purposes of clarity of illustration, a condition of the illuminating apparatus is chosen in which no light covering device can be seen on a burr band 9.

In one embodiment of the illuminating apparatus of a this invention an appropriate textile material for the light covering device 8 has burr bands at two opposite edges. Parallel to the burr bands, bendable wires are worked into an outer surface of the textile material, by means of which a bending of the light covering device provides a smooth stepless, adjustment between angles. Further, in this embodiment, because the burr bands are mounted on two edges of the applied light covering device 6, they can be caused to overlap whereby a great variety of shapes of the light covering device can be achieved.

Figure 13:
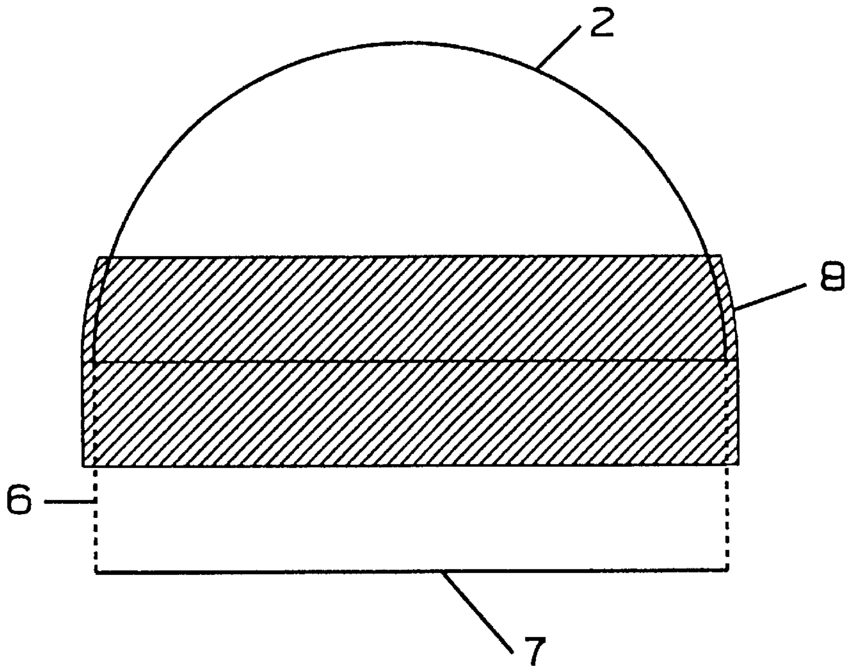
FIGS. 13 and 14 are side sectional schematic views of the second enhanced embodiment illuminating apparatus of this invention having a light cover apparatus in two different positions.
Figure 14:
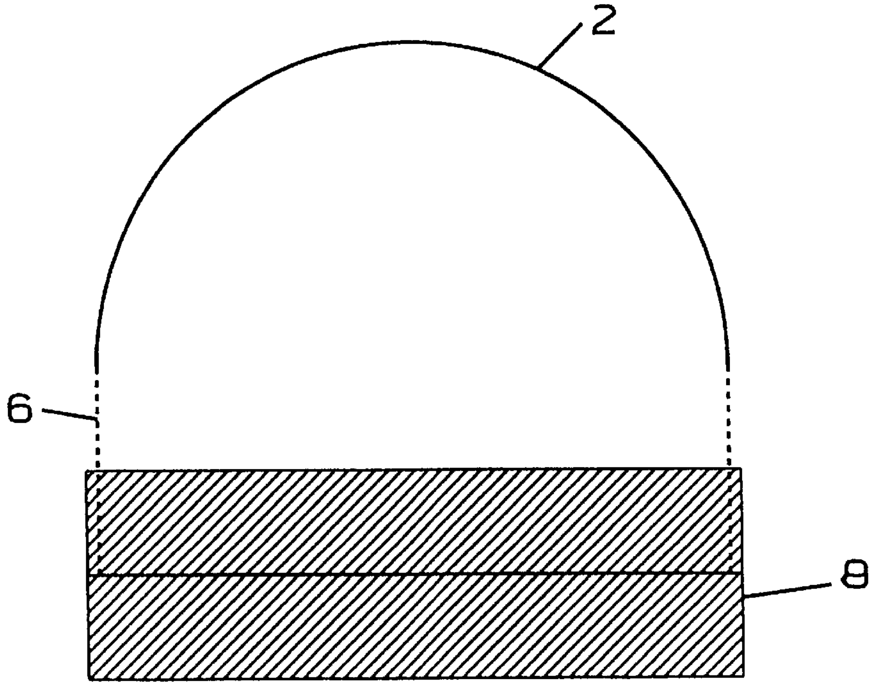

FIGS. 13 and 14 show examples for mounting the light covering device 8. As can be seen in FIG. 14, the light covering device 8 can be attached in such a manner that it extends beyond a shoulder of the wall 6 of the attachment in the reflecting direction of the first reflector 2.

Figure 15:
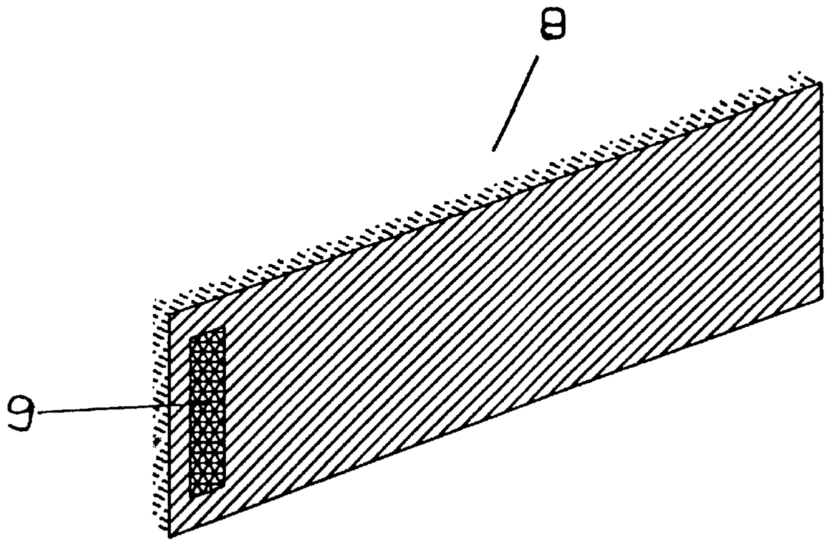
FIG. 15 is an isometric view of a light covering device which can be used with this invention having an interengaging (burr) attachment band.

FIG. 15 depicts a light covering device 8 with a burr band 9 that can be used with this invention.

Figure 16:
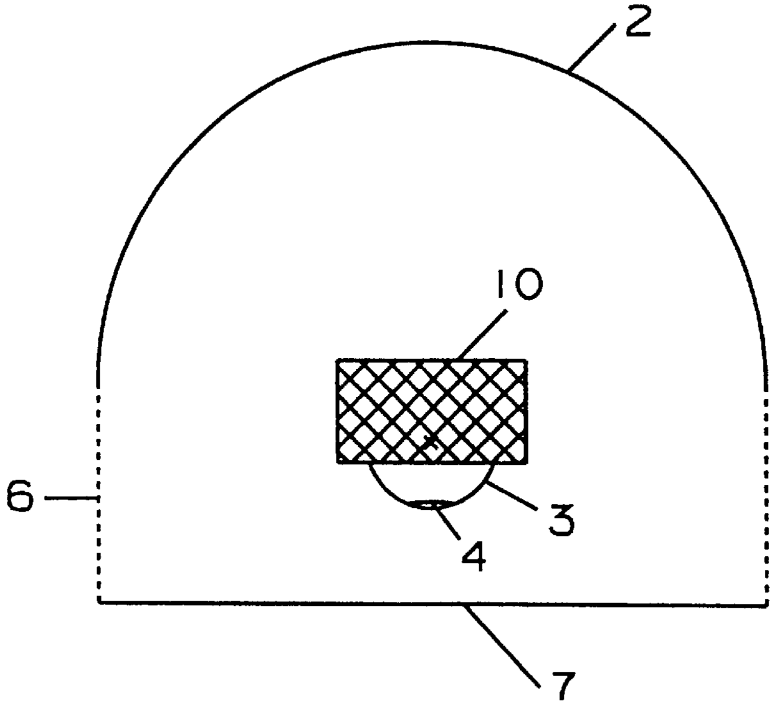
FIG. 16 is a schematic side sectional view of a third enhanced embodiment illuminating apparatus of this invention having a light source with an enclosing screen cage.

The exiting beams of light can, by means applying a wire cage 10 to surround the light source 1, can be softened. Such a third enhanced arrangement is shown in FIG. 16.

The wire cage 10, which is mounted on the light source 1, can have partially, smaller openings (a higher mesh density) be is partially covered by an inwardly reflecting surface and/or can be mounted to be rotatable about the light source 1.

Figure 17:
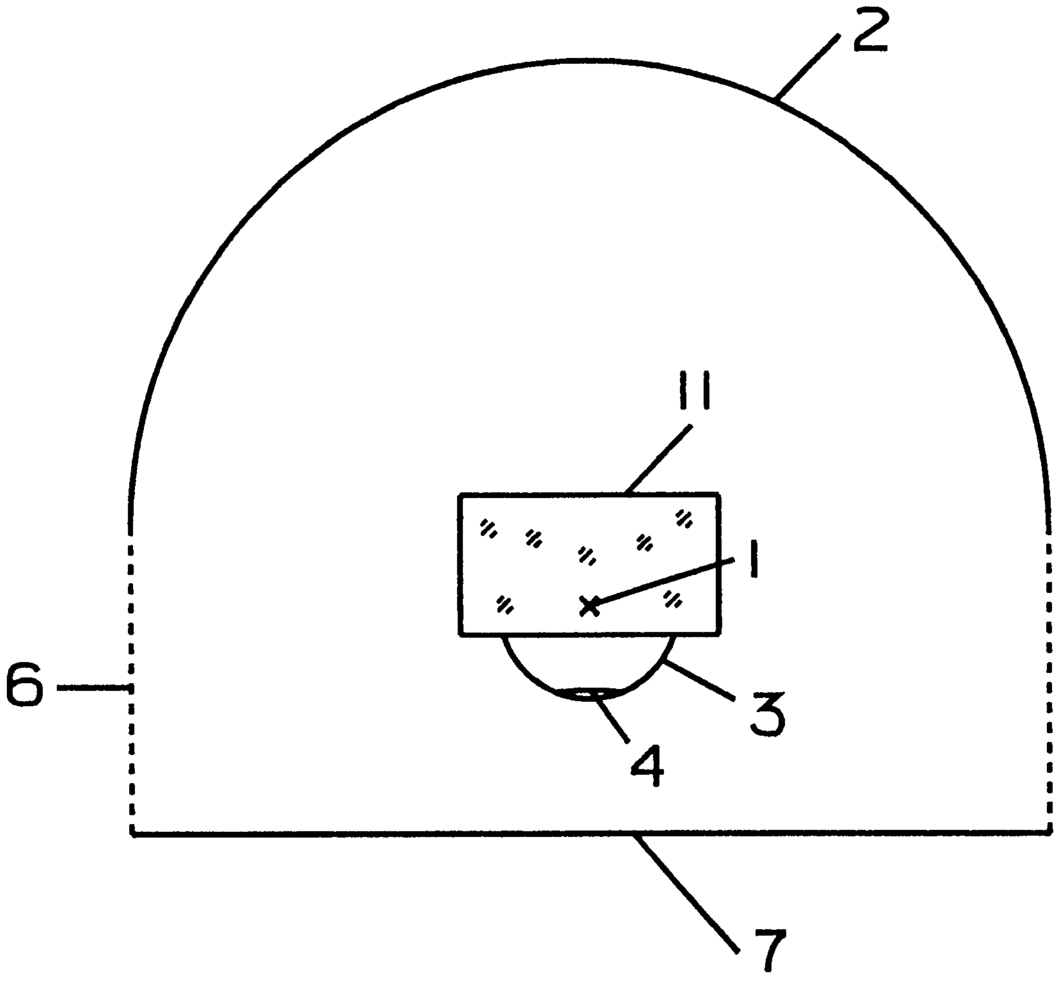
FIG. 17 is a schematic side sectional view of a fourth enhanced embodiment illuminating apparatus of this invention having a light source with a surrounding glass tube.
Figure 18A:
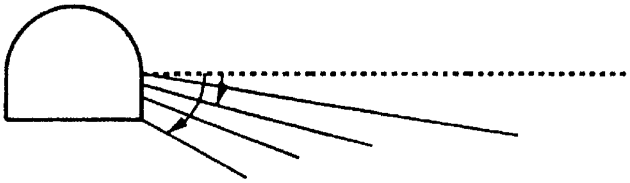
FIGS. 18A–D are schematic side views of illuminating apparatus of this invention illustrating a light distribution with bat-wing characteristics.
Figure 18B:
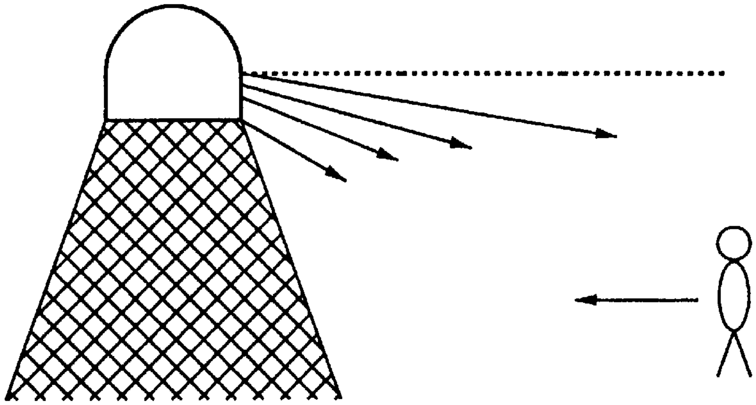
Figure 18C:
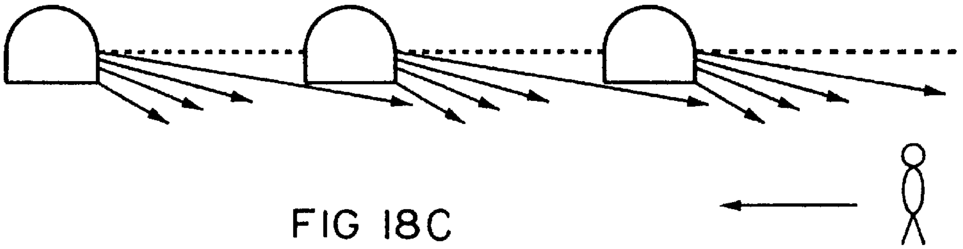
Figure 18D:
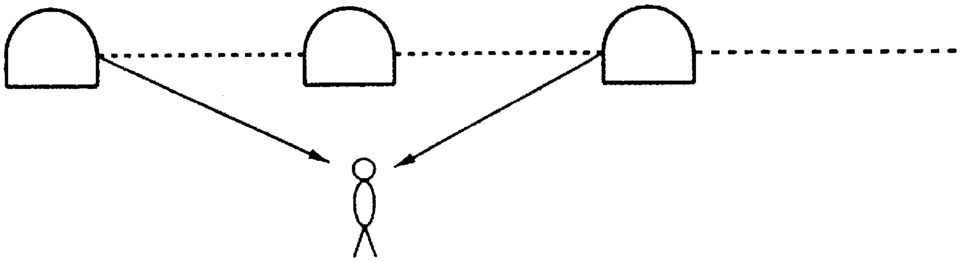

Instead of, or in additional to, the wire cage 10, a glass tube 11 can be mounted on the light source 1 as is shown in a fourth enhanced embodiment of FIG. 17. This can be provided with a dichroic film (e.g. a blue filter), so that, upon employment of an artificial-light lamp, its light is converted to a daylight color temperature.

When the illuminating apparatus of this invention is mounted to hang, radiation of its light directly downwardly is avoided. If a plurality of illuminating apparatus of this invention are employed simultaneously in a linear arrangement, the bat-wing light distribution of one illuminating apparatus properly cooperates with the bat-wing light distributions of adjacent illuminating apparatus, for appropriate choices of spacing between the individual illuminating apparatus. In this manner, a relatively uniform light intensity is achieved in a direction of the linear arrangement, regardless of where along this line a person to be illuminated stands, whereby there is no place along this line where light falls directly from above on the person. If a plurality of illuminating apparatus according to this invention are hung in a raster (rows and columns) configuration, a uniformity of illumination is accomplished in a side-wise, or lateral, direction as well. Also larger rooms can be illuminated by the illuminating apparatus of this invention, according to the requirements stated above, without the necessity of employing stands or additional light-producing measures.

In one embodiment, the illuminating apparatus has a third reflector which is arranged centrally to the reflector and is in the shape of spherical segment that bows toward the light source. Such a third reflector increases the portion of light escaping from the illumination appartus relative to the entire light created by the light source.

In a further embodiment of the illuminating apparatus of this invention there is a fourth reflector which has the shape of the exterior of a reflecting truncated cone which is arranged between the light source and the first reflector, with a small opening thereof, which is directed toward the light source, arranged substantially parallel to the opaque panel of the attachment which lies opposite the first reflector. The fourth reflector serves to increase that portion of the light escaping from the illuminating apparatus relative to all of the light produced by the light source.

The illuminating apparatus of this invention can have one or more light covering devices for attachment to the wall. By using such light covering devices, the light radiation can be reduced and an aiming of its direction can be influenced. By employing a plurality of illuminating apparatus of this invention, of this embodiment, in a linear or raster configuration, an accentuation of light intensity can be employed so that a light directed toward the camera is more intense than light radiated in a direction the camera sees. Also, a direct radiation of light into the camera objective can be simultaneously avoided. The more intensive opposite light makes possible a more three-dimensional (i.e. giving an impression of depth) illumination which is suitable to classic demands of the film and television art. When illuminating long, narrow corridors, a plurality of linearly arranged illuminating apparatus of this invention, of this embodiment, can be employed to create a relatively uniform incident, or reflected, illumination in a line of sight of the camera, with the opposite light (contrast light) being at a more intense light level. Simultaneously, light falling on the corridor walls is smoothly (without steps) reduced or eliminated. For a plurality of illuminating apparatus of this invention which are hung in a raster matrix, it is particularly beneficial to use embodiments of this invention with light covering devices thereon at an outer edge of the raster to reduce, as desired, or to eliminate, possible undesirable illumination on sidewalls of a room.

In a desirable embodiment of the illuminating apparatus of this invention, the light covering device(s) is (are) bendable. In this manner, a spreading direction of the light, and its intensity distribution, can be particularly influenced in a beneficial manner.

The opaque side of the attachment, opposite the first reflector, can be further coated on its surface facing the first reflector to be reflective so that light falling thereon will be thrown back and, after further reflection, will escape outwardly as useful light.

It is particularly beneficial that the light covering device (s) is (are) provided with burr bands so that, by means of burr closures, they can be attached to the wall. This makes possible a fast and uncomplicated covering and uncovering and a moving of the light covering device(s). Further, by this means, a smooth adjustable partial covering of a light exit surface is made possible.

In a further beneficial embodiment of the illuminating apparatus of this invention, the light source is enclosed in a wire cage.

The wire cage can have partially smaller openings. In this manner, the light intensity can be accentuated in its direction distribution.

The wire cage can further have a portion of its interior covered by a reflecting surface. In this manner, the light intensity of the direction distribution is even more strongly accentuated.

A particularly uncomplicated and beneficial possibility for influencing the light spreading direction and accentuating light intensity distribution results from another embodiment of the invention in which the wire cage is mounted to be rotatable about the light source. In this manner, accentuation of (or a customizing of) the light intensity can be smoothly adjusted throughout 360°.

A further beneficial embodiment of the illuminating apparatus of this invention is created when the light source, possibly in addition to the wire cage, is surrounded by a glass tube.

The glass tube can have a dichroic film. In this manner it is possible to adapt the light source to day or artificial color temperatures.

While the invention has been particularly shown and described with reference to a preferred embodiment, it will be understood by those of ordinary skill in the art that various changes in form and detail may be made therein without departing from the spirit and scope of the invention.

The invention claimed is:

1. Illuminating apparatus comprising:

a light source;

a first reflector arranged for reflecting light radiated by the light source;

a three dimensional attachment, mounted on the first reflector in a reflecting direction of the first reflector, said attachment having a sidewall with a light-transmitting and scattering portion and an opaque panel positioned opposite the first reflector; and;

a second reflector having a shape of a spherical segment, said second reflector being: arranged between the light source and the opaque panel of the attachment positioned opposite the first reflector; being smaller than the first reflector; and having a reflecting, concaved, side facing the light source.

2. Illuminating apparatus as in claim 1 wherein there is a third reflector which is arranged to be centrally located relative to the second reflector and which has a spherical shape so as to have a convex bow directed toward the light source.

3. Illuminating apparatus as in claim 1 wherein there is a truncated cone reflector-which has the shape of an outer surface of a truncated cone, which is arranged between the light source and the first reflector, and which has a small central opening positioned adjacent the light source, with the small opening, lying in a plane which is substantially parallel to the opaque panel of the attachment lying opposite the first reflector.

4. Illuminating apparatus as in claim 1 wherein there is at least one light covering device for being attached to the wall.

5. Illuminating apparatus as in claim 4 wherein the at least one light covering device can be bent.

6. Illuminating apparatus as in claim 4 wherein the at least one light covering device has at least one burr band thereon for mounting said light covering device on said attachment.

7. Illuminating apparatus as in claim 1 wherein the opaque panel of the attachment lying opposite the first reflector has a reflective layer on its surface facing the first reflector.

8. Illuminating apparatus as in claim 1 wherein is further included a wire cage for surrounding said light source.

9. Illuminating apparatus as in claim 8 wherein the wire cage has smaller opening surfaces in only a portion thereof.

10. Illuminating apparatus as in claim 9 wherein the wire cage is mounted to be rotatable about the light source.

11. Illuminating apparatus as in claim 8 wherein an interior of the wire cage is partially covered by an inwardly reflecting material.

12. Illuminating apparatus as in claim 11 wherein the wire cage is mounted to be rotatable about the light source.

13. Illuminating apparatus as in claim 1 wherein is further included a glass tube for enclosing the light source.

14. Illuminating apparatus as in claim 13 wherein the glass tube has a dichroic layer thereon.

* * * * *